United States Patent [19]

Schwesig

[11] Patent Number: 4,730,246

[45] Date of Patent: Mar. 8, 1988

[54] METHOD AND APPARATUS FOR OPERATING A PULSE FREQUENCY CONVERTER WITH COMPENSATION OF FAULT VOLTAGE-TIME AREAS CAUSED BY CARRIER STORAGE EFFECTS

[75] Inventor: Günter Schwesig, Erlangen, Fed. Rep. of Germany

[73] Assignee: Siemens Aktiengesellschaft, Munich, Fed. Rep. of Germany

[21] Appl. No.: 915,082

[22] Filed: Oct. 3, 1986

[30] Foreign Application Priority Data

Nov. 21, 1985 [DE] Fed. Rep. of Germany ....... 3541227

[51] Int. Cl.$^4$ ............................................ H02H 7/122
[52] U.S. Cl. ...................................... 363/56; 363/132; 363/98
[58] Field of Search ................................ 363/41, 56–58, 363/98, 132, 136, 137

[56] References Cited

U.S. PATENT DOCUMENTS

| | | | |
|---|---|---|---|
| 3,710,229 | 1/1973 | Jessee | 363/41 |
| 4,150,423 | 4/1979 | Boschert | 363/56 X |
| 4,447,867 | 5/1984 | Evans et al. | 363/132 X |
| 4,535,399 | 8/1985 | Szepesi | 363/41 |
| 4,633,381 | 12/1986 | Upadhyay | 363/56 |

Primary Examiner—Patrick R. Salce
Assistant Examiner—Marc S. Hoff
Attorney, Agent, or Firm—Kenyon & Kenyon

[57] ABSTRACT

For the alternating drive of switches of a pulse frequency converter acting on a common AC-side terminal, the control pulses of the switches must be jointly latched at each alternation. For each switch, the control signal applied for its latching may be regarded as a set value for its switch voltage, whereas the actual switch voltage occurs only if after a storage time this switch actually extinguishes. By integration of the deviance, therefore, a correction signal is formed which is proportional to the storage time of the last fired switch or to the voltage-time area occurring at the output during the latch time. Thereby the distorting influence of voltage-time areas which are caused due to the spread between units of different latch times of different switches can be taken into consideration in the formation of the width-modulated control pulses.

14 Claims, 4 Drawing Figures

METHOD AND APPARATUS FOR OPERATING A PULSE FREQUENCY CONVERTER WITH COMPENSATION OF FAULT VOLTAGE-TIME AREAS CAUSED BY CARRIER STORAGE EFFECTS

BACKGROUND OF THE INVENTION

The present invention relates to a method and apparatus for operating a pulse frequency converter, in particular, a pulse frequency converter having switching transistors or gate turn-off thyristors (GTO's).

A preferred area of use is the feeding of a rotating field machine by means of a pulsed three-phase system. With reference to FIG. 1 of the drawings for background, an asynchronous machine ASM is connected via a pulse inverter to the terminals P, N of a d-c voltage. For the control of the machine, for example, the terminal voltages UR, US, UT of the machine may be measured by a corresponding measuring device MU and processed to a desired value for the terminal voltage UR in a regulating and control unit RZ together with desired values f*, U* for frequency and amplitude of the inverter output voltage.

Depending on the control law intended for the practical case, of course, also other set point and/or actual values may be used. For the control or regulation of the machine, generally a sinusoidal or trapezoidal shape of the phase voltages is advantageous, which is given by the shape of a corresponding control voltage UR*, associated with the phase R, for example, in order to control the switches acting on the common inverter-side terminal R. The control pulses S1, S2 for the switches T1, T2 acting on this terminal are then derived from UR*. The equivalent applies also to the control pulses S3, S4 or S5, S6 for the switches T3, T4 acting on terminal S or respectively the switches T5, T6 acting on terminal T, an antiparallel by-pass diode V1 . . . V6 being connected antiparallel to each switch.

In the following, the invention will be explained only with reference to the drive for the switches T1, T2 acting on the AC-side terminal R. The method employed and the components needed are to be used in the same manner for the drive of the other switches and will not be explained separately in the additional figures.

By alternating drive of the switches T1 and T2 either only the positive terminal voltage or only the negative terminal voltage can be connected through to the terminal R. The voltage URS, therefore, can consist only of bipolar voltage pulses, e.g. with a sinusoidal width modulation. In the machine, these pulses lead, by smoothing, to a phase current corresponding to the (e.g. sinusoidal) shape of the control voltage UR*. For the pulsed drive of the switches, therefore, advantageously a high pulse frequency, e.g. several kilo-Hertz, is present, and advantageously transistors or GTO thyristors are used as fast-switching frequency converter switches.

The control pulses S1, S2 are derived from a pulse-width modulated control voltage UM*, which a pulse-width modulator PM forms by sampling the control voltage UR* with a high-frequency, usually triangular gating voltage.

For ideal switches, whose conducting state ends immediately with the end of the driving control pulse, it would actually be necessary only to amplify the pulses of the pulse-width modulated control voltage UM* in a subsequent pulse evaluation stage PA and then to supply them unchanged to switch T1 and inverted to switch T2.

In reality, however, switch T1 requires, after removal of its control pulses S1, a certain time until its conducting state is ended and hence no current can flow from terminal P via switch T1 any more, and instead the current in phase R is commutated from switch T1 to switch T2 or (if T2 is non-conducting) to the by-pass diode V2. In a "storage time" ST1 characteristic for switch T1, therefore, the conducting state is stored even after removal of the control pulse S1, and the phase voltage UR is connected through from the positive terminal voltage to the negative terminal voltage only then.

During this storage time, switch T2 must not yet be driven, to avoid short-circuit of the d-c voltage. The equivalent applies for the storage time ST2 of switch T2 when the control pulse S2 for switch T2 is removed. With the alternating drive of the switches, these switches, therefore, must be jointly latched or interlocked briefly between two pulse-width modulated control pulses with which they are driven alternately.

This latching is done by an appropriate circuit (not shown specifically) in the pulse evaluation stage PA. Generally a constant latch time is adjusted, which must then be longer than the maximum storage time possible in one of the two switches. Hence the control pulses S1 and S2 are shorter by the latch time VT than the binary states of the pulse-width modulated control voltage UM* from which they are derived. Accordingly, the control pulses describe a pulse-width modulated curve whose amplitude is reduced in accordance with the latch times VT and the number of latches occurring within one UR* period. This reduction can actually be taken into account already in the formation of UR* or MR* and hence in the pulse-width control for the control pulses.

Affecting the actual voltage UR is not the latch width VT, but the difference VT-ST1 upon commutation of the current of T1 or respectively the difference VT-ST2 upon commutation of the current of T2. But the storage times of a semi-conductor switch are subject to wide spreads between units and may vary also dependent on load.

While the different storage times after two latches in each instance, i.e. in an alternating cycle, have little effect, they add up, because of the high switching frequency, within a period of the control voltage UR*, which corresponds to the set value for the smoothed voltage UR, to a deviation of the actual voltage which appears as interfering distortion of the desired waveform.

SUMMARY OF THE INVENTION

It is an object of the present invention to avoid such distortions caused by carrier-storage effects during the latching times.

The above and other objects of the invention are achieved by a method for operating a pulse frequency converter, in particular, a pulse frequency converter having transistors or turn-off thyristor switches, wherein from a control voltage for two frequency converter switches acting on a common AC-side terminal, control pulses for the alternating drive of these switches are formed and the switches are jointly latched briefly between two width-modulated control pulses, and wherein, during the latch times a voltage-time area is formed by integration during the latch times from a measured signal corresponding to the switch voltages and the width of the control pulses is precontrolled with a correction quantity derived from the voltage-time area as an interference quantity.

Apparatus in accordance with the invention will also be described.

BRIEF DESCRIPTION OF THE DRAWINGS

The invention will be explained more specifically with reference to two embodiments shown in the drawing figures in which.

DETAILED DESCRIPTION

Figure 1:
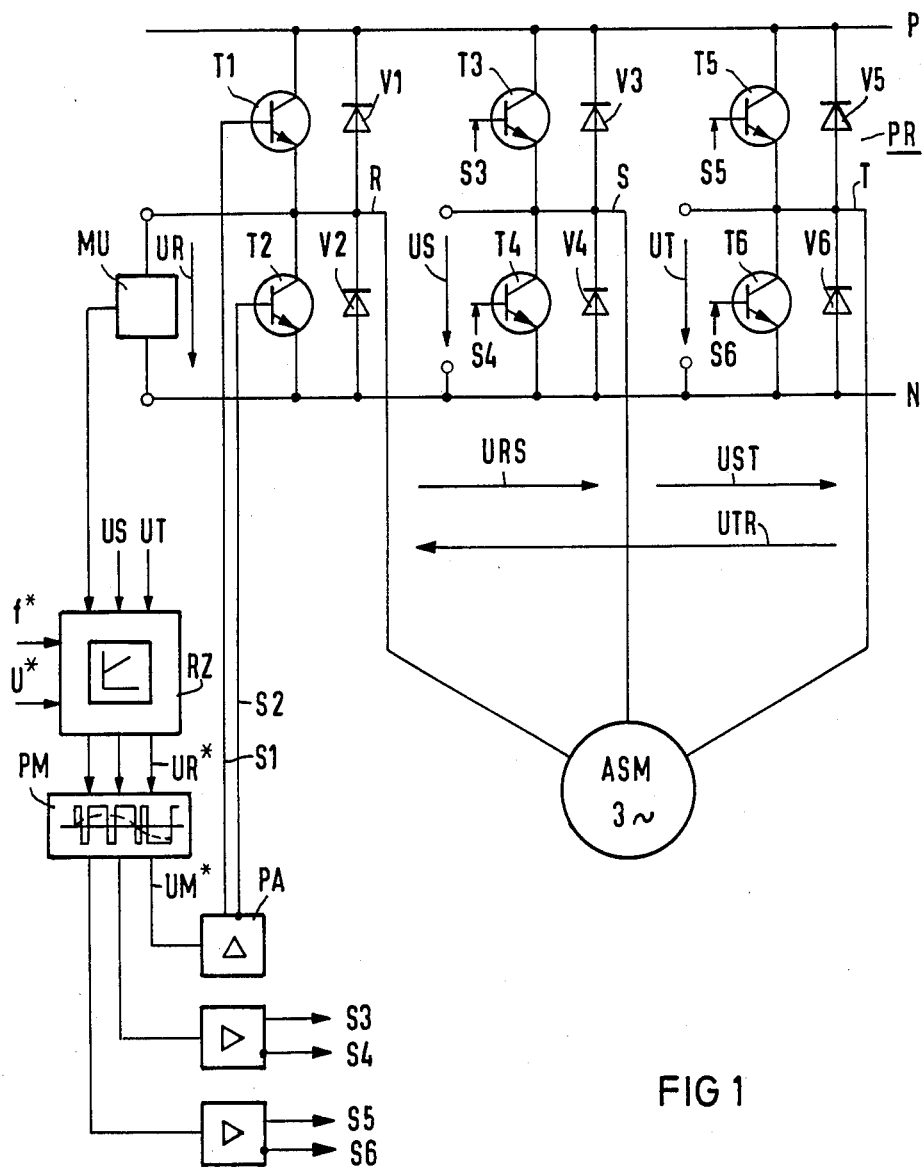
FIG. 1 shows the already explained preferred application of the invention.
Figure 2:
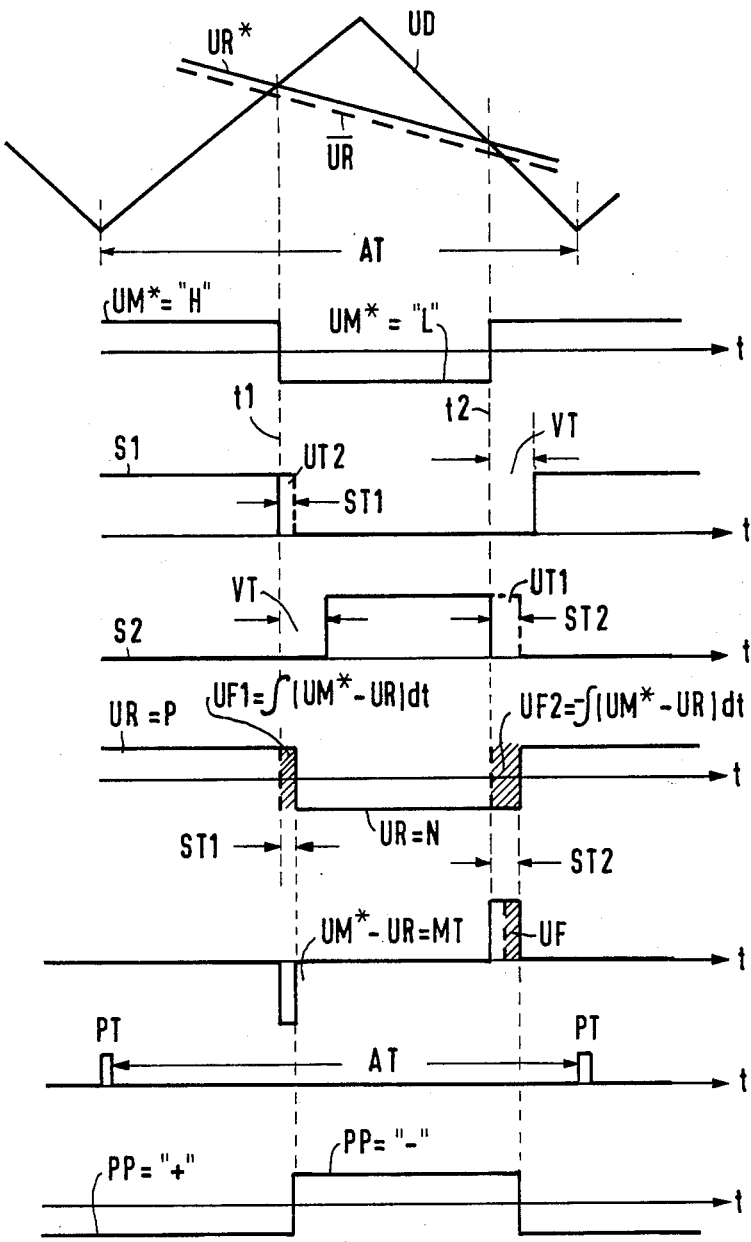
FIG. 2 shows typical signal patterns in carrying out the invention.

With reference now to FIG. 1 and the further drawings, FIG. 2 shows firstly the shape of the unmodulated control voltage UR* and of the high-frequency gating voltage UD, from the intersections of which the pulse-width modulator PM forms the pulse width modulated control voltage UM*. To the state UM* =H there corresponds a pulse from which the control pulse S1 for switch T1 is to be derived, while the state UM* =L is associated with a pulse for the formation of the control pulse S2 for the drive of switch T2. If T1 is at first driven by the control pulse S1, the voltage P is switched through to terminal R and is available as switch voltage at the non-conducting switch T2. Therefore, if the switch voltages are normalized to the applied d-c voltage and if the forward voltage drop of the switches is disregarded, the switch voltage UT2 may be regarded as a binary actual value signal with which the set point signal S1 is associated. They are identical up to the time T1 at which the control pulse S1 ends.

Now the current previously flowing through T1 requires the storage time ST1 before it can commutate to the bypass diode V2 or the then fired switch T2. The switch voltage UT2 or respectively the voltage UR does not collapse until the time t1+ST1. As compared with the desired voltage preset by UM* or S1 during the latch time, there results by integration of the variance a voltage-time area $UF1 = \int (UM^* - UR)dt$. For the duration of the latch time VT the control pulses S1, S2 remain interlocked for both switches T1, T2 jointly, and the control pulse S2 is released only with the time shift given by the latch time VT after the pulse edge of the pulse-width modulated control voltage UM*.

At time t2, in accordance with the pulse edge of UM*, a reverse commutation of the current to switch T1 is to be carried out, and control pulse S2 is terminated. S1, on the contrary, remains cut off for the duration of the latch time VT. But the switch voltage UT1 of switch T1, which is again represented as a binary actual value, changes over to the initial state only at time t2+ST2, as switch T2 is still conducting during the storage time T2. There results, therefore, as compared with the binary set value UM* or respectively the set value ST2 for the switch voltage UT1 again a voltage-time area UF2.

Since in the conducting state of one switch the voltage UR is present as switch voltage at the other switch, it is possible to pick up as common measure for the respective switch voltages directly the voltage at the terminal R. In particular, it suffices to pick up as measurement value for the switch, voltages or respectively for this terminal voltage merely one binary signal. Preferably the actual voltage is picked up potential-free. It can then be compared with the control pulses in a simple manner. The corresponding binary set values are given by the control pulse sequences S1, S2 or respectively by the pulse-width modulated control voltage UM* taken as a basis for the control pulses jointly.

In FIG. 2, the corresponding voltage-time areas UF1 and UF2 in two successive latch times are shown hatched as integrals of the deviance UM*−UR, which thus assumes during the storage times ST1 and ST2 the values±1, while for the remaining duration of each latch time and between the latches there applies UM*−UR=0.

Besides the curve of the unmodulated control voltage UR there is shown in FIG. 2 also the curve $\overline{UR}$ of the smoothed terminal voltage. The deviation of the two quantities depends on the respective fault voltage-time area UF=UF1−UF2 and hence on the storage time, which therefore acts as interference quantity and can be taken into account as anticipatory control variable in the sense of an interference quantity addition in the pulse width modulation. If, therefore, for example a correction quantity derived from the fault voltage-time area of the switch T1 is added to the control voltage UR*, the duration of the state UM*=H can be lengthened accordingly and the pulse width of S1 precontrolled.

Determining for the difference $UR^* - \overline{UR}$, however, is only the difference UF, hatched in FIG. 2, of the storage times or voltage-time areas UF1, UF2. For this reason the respective time area difference, or a suitable function thereof, is used as correction quantity. In the case of binary actual and set values, this difference can be formed by integration of the fault voltage (UM*−UR) over a full alternation cycle. But it suffices to perform the integration only during the two latch times of a cycle and then to add the integrals correct as to sign or respectively to subtract the amounts thereof.

In FIG. 2,therefore, a cycle clock pulse PT is shown which initiates a new alternation cycle each time, to form the difference of the fault voltage-time areas occurring within a cycle. This pulse PT is derived in the example from the negative amplitude of the gating voltage UD, or it may be derived from the edges of the control pulses or otherwise.

The difference between the two binary signals UM* and UR suppresses the deviations of the exact (analog) measured value of the switch voltages from their set values. A positive difference signal $UM^* - UR$, therefore, represents a measuring pulse which characterizes the conducting state of switch T1, and the duration of which equals the storage time ST1. Correspondingly a negative difference signal represents a measuring pulse for the conducting state of switch T2. To form the correction quantity for the pulse widths it suffices, therefore, instead of measuring the exact fault voltages, simply to integrate these measuring pulses, taking note of the sign. The integration (that is, in the digital case, a counting process) then supplies measuring pulse durations which are approximately proportional to the voltage-time areas UF1, UF2 and comprise the storage times.

For sign-correct correlation of the two measuring pulse durations occurring within an alternating cycle to the switch voltages, there is shown, in FIG. 2 a polarity signal PP, which is derived from suitable pulse edges, e.g. the negative edge of UR.

Figure 3:
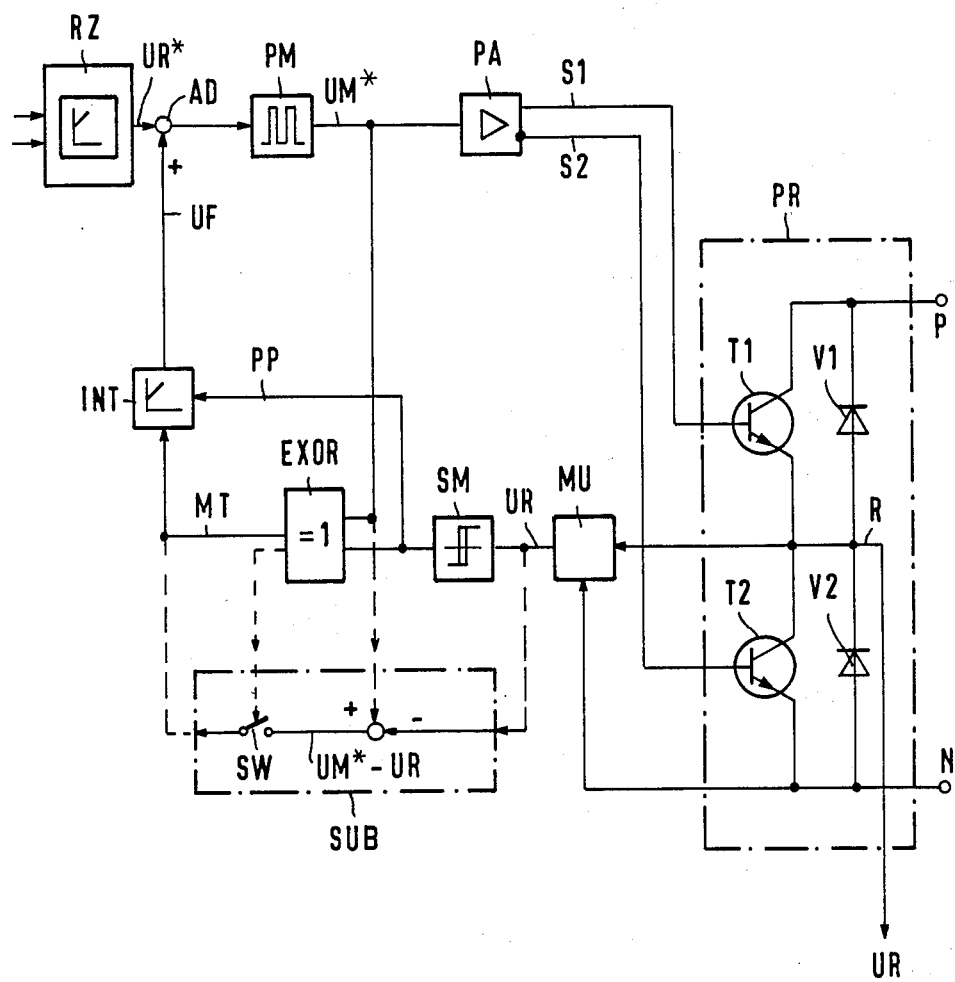
FIGS. 3 and 4 show forms of realization of the invention in analog and digital design, respectively.

In FIG. 3 is shown a first embodiment of the invention, constructed with analog circuitry, which contains the control device RZ already known from FIG. 1, the pulse frequency converter PR with its switches T1, T2 correlated with its terminal a-c voltage UR, and the bypass switches V1 and V2, as well as the modulation stage consisting of the pulse width modulator PM and the pulse evaluation stage PA. For the control of the pulse widths of the control pulses S1, S2, a correction quantity derived from the output signal UF of an integrator INT must be added to the control voltage UR* at an addition element AD.

The voltage UR is determined by the switch voltage measuring device as a measuring signal which represents the conducting state of a driven switch.

To explain the method according to the invention, we consider first the subtraction circuit SUB, in which the set value given by UM* for the switch voltages is compared with the actual value determined by UR, in order subsequently to be supplied to the integrator INT for the formation of the voltage-time area occurring during a latch time. In this connection, MT is to designate at first a switching pulse which is supplied, not to the integrator input, but to the control input of a switch SW, and which releases the integrator input at most during one latch time in each instance. Actual voltage values UR picked up outside the interlock time are, therefore, out of engagement for the determination of the correction quantity.

The switching pulse MT is formed by linkage of the pulse-width modulated control voltage UM* (or by substitution of the control pulses S1, S2 derived therefrom) with the measuring signal UR, which by means of a threshold element SM can be transformed into a binary signal directly comparable with the pulse-width modulated control voltage UM*. Now if switch T1 is driven by the signal states UM*=H and switch T2 is cut off by S2=L, the terminal voltage UR is practically equal to the switch voltage UT2 of switch T2 and the threshold element SM is in state H, so that a following EXCLUSIVE-OR gate EXOR produces no switching pulse (MT=0). This state exists also when UM*=S1=L, S2=H and when due to cutoff of switch T1 the terminal voltage UR equals the switch voltage UT1 of switch 1 and the threshold element output signal L is present.

At time t1 represented in FIG. 2, UM* and S1 now change over to their other state, whereas for the duration of the storage time ST1 the threshold element SM remains in its original state in accordance with the still conducting switch T1. Consequently, for the duration of the storage time ST1, the switching pulse MT=L is present, and switch SW delivers the difference UM*−UR as the measured pulse to the integrator input. But when at the end of the storage time ST1 switch T1 closes and therefore UR flips over, the measuring pulse MT disappears and switch SW again brings the measuring signal UR out of engagement. Consequently the measuring signal UR or respectively the corresponding difference UM*−UR is integrated in the integrator only for the duration of the measuring pulse MT.

As has been explained before with reference to FIG. 2, there may be integrated in the integrator, instead of the switch, voltages UR, a binary signal which occurs only during a latch time and ends with the end of the conducting state of a switch. This is the case for the measuring pulse MT, which thus is equivalent to the difference UM*−UR. The gate EXOR assumes the role of the subtraction element SUB, if the polarity signal PP is used to take into account the polarity reversal, occurring during a latch time, of the measuring signal UR by a corresponding sign evaluation at the integrator input. In this case, the subtraction element SUB with its inputs and outputs is superfluous.

Figure 4:
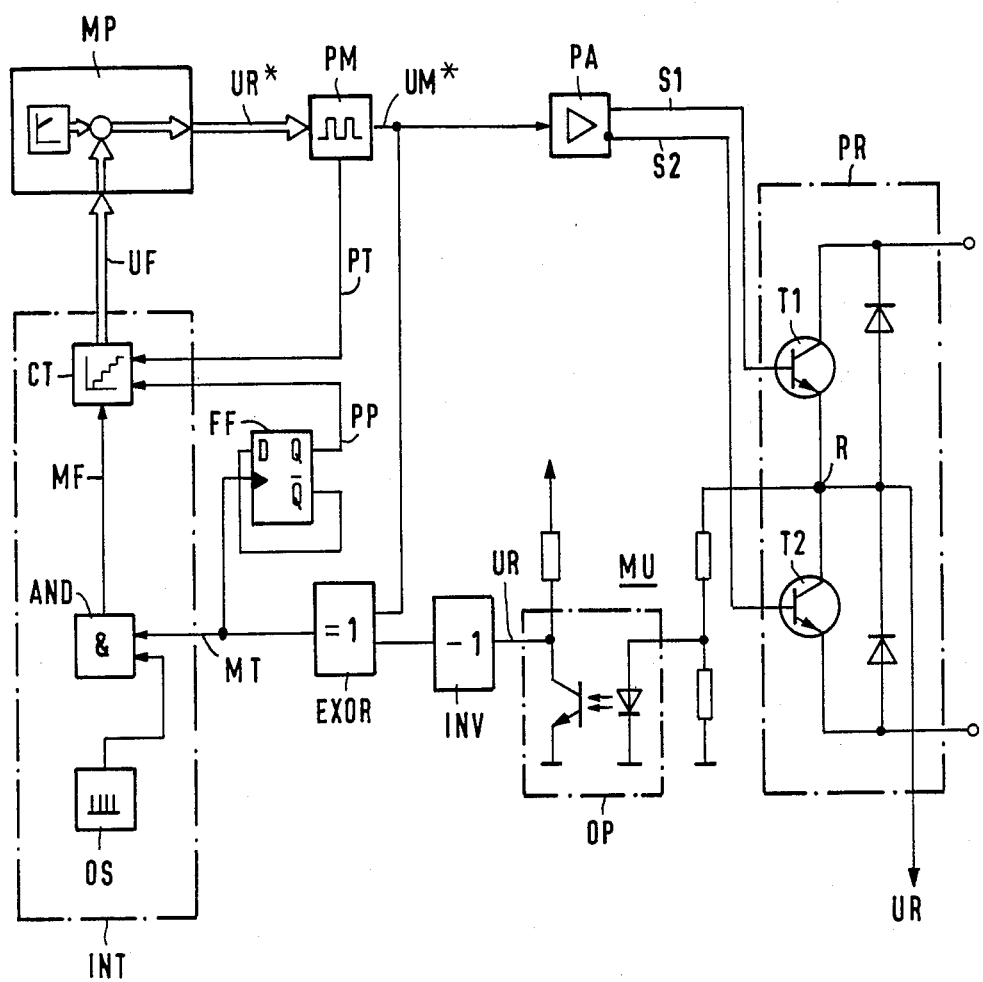

This arrangement can readily be implemented in completely digital form, as illustrated in the preferred embodiment according to FIG. 4. In this embodiment, the control unit RZ is replaced by a microprocessor MP, which from digital input set and actual values supplies the unmodulated control voltage UR* with consideration of the - now likewise digitally fed -correction signal UF. The pulse width modulator PM and the pulse evaluation stage PA form therefrom the control pulses S1 and S2.

The switch voltage measuring device contains an optocoupler OP for potential-free measurement of the switch voltages, both switch voltages being picked up jointly at their common terminal by the voltage UR due to the described relationship. An inverting element INV forms a binary measuring signal, the signal state H of which thus defines the conducting state of a switch. In a logic circuit, which contains a counter control in addition to the gate EXOR representing the linking logic, these states are transformed into the measuring pulse MT.

Instead of an analog integrator, a bidirectional counter CT for the pulses of a counting pulse generator OS is provided, the pulse frequency of which may be, for example, several MHz, and which thus has a short pulse period compared with the latch times. The input of this counter is released by the AND gate only in case of coincidence measured pulse MT, while the counting direction is determined by the polarity signal PP.

This polarity signal PP is formed by means of a D flip-flop from the edges of the measuring pulse MT in such a way that after two latch times the counting direction is reversed.

In order, moreover, to form as a correction quantity only the difference of two voltage-time areas measured in successive latch times, the counter reading is reset by the previously mentioned alternation clock pulse PT always at the beginning of an alternation period, so that at the end of the alternation period only the time area difference UF shown in FIG. 2 is read out and used for pulse width correction.

The invention thus makes it possible by a relatively simple accessory device, in particular in transistorized pulse frequency converters, to avoid a distortion of the output a-c voltage caused by the carrier-storage effect.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A method for operating a pulse frequency converter, in particular a pulse frequency converter having transistor or gate turn-off thyristor switches, comprising forming, from a control voltage for two frequency converter switches coupling a common AC output terminal of the converter alternatingly to one of two DC input connections to the converter, two pulse width modulated control pulses for the alternating drive of respective ones of said two switches, interlocking the switches jointly briefly between the two pulse width-modulated control pulses during a latch period, generating a voltage-time area by integration during the latch periods from a measured signal corresponding to a switch voltage and controlling the width of the control pulses with a correction quantity derived from the generated voltage-time area as an interference quantity.

2. The method recited in claim 1, further comprising sensing and integrating during a latch period the deviation of the actual switch voltage of the last driven switch from the desired voltage preset by the pulse-width modulated control pulses.

3. The method recited in claim 2, wherein the actual switch voltage is sensed by sensing means galvanically isolated from the switch.

4. The method recited in claim 1, further comprising forming within an alternation cycle containing two latch periods the correction quantity from the difference of the voltage-time areas determined during the two latch periods.

5. The method recited in claim 1, wherein the two switch voltages are sensed jointly by measurement of the voltage at a common terminal of the two switches.

6. The method recited in claim 1, further comprising using as a measure for the voltage-time area occurring during a latch period, the storage time of the last driven switch and determining the storage time of said switch by measurement of the time between the end of its control pulse and the end of its conducting state.

7. The method recited in claim 1, further comprising forming and integrating, in an alternation cycle containing two latch periods, at the end of a control pulse, a measuring pulse lasting to the end of the conduction state of the switch associated with the control pulse, forming, from the difference of the integrals formed in the two latch periods, the correction quantity and adding the correction quantity to the control voltage to form the pulse width-modulated control pulses.

8. Apparatus for operating a pulse frequency converter, in particular a pulse inverter having transistor or gate turn-off thyristor switches comprising:
control means for forming a control voltage for two alternately driven frequency converter switches coupling a common AC output terminal to DC input connections of the converter;
modulation means controlled by the control voltage for forming two pulse width-modulated control pulses for respective ones of said two current converter switches, and including means for brief joint interlocking of the two switches at the end of a control pulse for a respective switch during a latch period;
switch voltage measuring means for forming a measuring signal corresponding to the conducting state of a driven switch;

logic circuit means having the measuring signal and the pulse-width modulated control voltage as inputs for forming a measuring pulse;
means for integrating the measuring pulse; and
means for generating a correction signal correcting the control voltage in dependence on an output signal of the integrating means.

9. the apparatus recited in claim 8, wherein the switch voltage measuring means comprises an optocoupler means.

10. The apparatus recited in claim 8, further comprising means for cutting-off the integrator input outside the latch periods.

11. The apparatus recited in claim 10, further comprising means coupled to the output of the switch voltage measuring means receiving a measuring signal for detecting the logic state of the switch voltages, the measuring signal being linked with the pulse-width modulated control voltage in linking logic means controlling the cutting-off means such that the integrating means input is cut off if during a latch period a switch voltage occurs at the last driven switch.

12. The apparatus recited in claim 8, further comprising integrating control means which, during an alternation cycle containing two latch periods, rates the measuring pulse occurring during a latch period with different signs and after each alternation cycle adds the sum of the two measuring pulses integrated with different signs to the control voltage input of the modulation means.

13. The apparatus recited in claim 8 wherein
the control means produces a digital control voltage to which is added a digital correction signal;
the modulation means comprises a pulse width modulator means for producing a pulse-width modulated binary control voltage and a pulse evaluation means for forming a pulse-width modulated control pulse sequence for each switch;
the logic circuit means comprises linking logic means fed by the the binary measuring signal and by the pulse-width modulated control pulse sequences or the pulse-width modulated control voltage, said linking logic means generating a binary measuring pulse always after termination of a control pulse to the end of the conducting state of the switch driven by the control pulse, and counter control means which within an alternation cycle containing two latch periods rates the two occurring measuring pulses with a different sign;
the intetgrating means comprising a counting pulse generator having a short pulse period as compared to the latch period and a following bidirectional counter means, an input of the counter means being released during the measuring pulse and a counting direction thereof being given in accordance with a sign rating of the measuring pulse; and
the output signal of the integrating means is supplied to the control means for forming the digital correction signal.

14. The apparatus recited in claim 8 wherein the integrating means is resettable via a reset input at the beginning of each alternation cycle.

* * * * *